US012602889B2

(12) United States Patent
Powers et al.

(10) Patent No.: US 12,602,889 B2
(45) Date of Patent: Apr. 14, 2026

(54) METHOD AND SYSTEM OF RENDERING A 3D IMAGE FOR AUTOMATED FACIAL MORPHING

(71) Applicants:Mathew Powers, New York, NY (US); William A. Kennedy, New York, NY (US)

(72) Inventors: Mathew Powers, New York, NY (US); William A. Kennedy, New York, NY (US)

( * ) Notice: Subject to any disclaimer, the term of this patent is extended or adjusted under 35 U.S.C. 154(b) by 0 days.

(21) Appl. No.: 17/001,682

(22) Filed: Aug. 25, 2020

(65) Prior Publication Data

US 2021/0074076 A1 Mar. 11, 2021

Related U.S. Application Data

(63) Continuation-in-part of application No. 16/888,798, filed on May 31, 2020, now abandoned, which is a continuation of application No. 16/398,242, filed on Apr. 29, 2019, now Pat. No. 10,803,677.

(60) Provisional application No. 62/774,864, filed on Dec. 4, 2018, provisional application No. 62/664,271, filed on Apr. 30, 2018.

(51) Int. Cl.
*G06T 19/20* (2011.01)
*G06T 5/20* (2006.01)
*G06T 11/60* (2006.01)
*G06V 40/16* (2022.01)

(52) U.S. Cl.
CPC ............... *G06T 19/20* (2013.01); *G06T 5/20* (2013.01); *G06T 11/60* (2013.01); *G06V 40/165* (2022.01); *G06V 40/171* (2022.01)

(58) Field of Classification Search
CPC ................... G06T 19/20; A61B 34/10; A61B 2017/00792
See application file for complete search history.

(56) References Cited

U.S. PATENT DOCUMENTS

| | | | |
|---|---|---|---|
| 2013/0201187 A1* | 8/2013 | Tong | G06K 9/6255 345/420 |
| 2017/0169285 A1* | 6/2017 | Chen | G06V 40/171 |
| 2019/0253614 A1* | 8/2019 | Oleson | G06T 7/75 |

* cited by examiner

*Primary Examiner* — Phi Hoang

(57) ABSTRACT

In one aspect, a computerized method for rendering a three-dimensional (3D) digital image for automated facial morphing includes the step of determining that a user's face is in a compliant state. The method includes the step of scanning of the user's face with a digital camera to obtain a set of digital images of the user's face. The method includes the step of implementing an analysis of the set of digital images and implementing a set of pre-rendering steps. Each digital image comprises a depth data, a red/green/blue (RGB) data, and a facemask data, implementing an iterative closest path (ICP) algorithm that correlates the set of digital images together by stitching together the cloud of points of the facemask data of each digital image and outputs a set of transformation matrices.

13 Claims, 15 Drawing Sheets

300

IMPLEMENT ICP ALGORITHM
202

IMPLEMENT TSDF ALGORITHM
204

IMPLEMENT MARCHING CUBES ALGORITHM
206

CLEANING STEPS
208

IMPLEMENT POISSON ALGORITHMS
210

IMPLEMENT TEXTURE MAPPING
212

IMPLEMENT IMAGE STITCHING
214

200

300

400

500

600

700

800

900

1000

USE DLIB FOR FACIAL LANDMARK DETECTION
1202

ADDITIONAL FACIAL LANDMARK DETECTION ON OUTPUT OF
STEP 1202 WITH 78 POINT MODEL
1204

MODEL RETRAINING
1206

HAIR COLOR DETECTION
1208

1200

DETERMINE THE SKIN COLOR THAT REPRESENTS THE WHOLE FACE OF A
USER
1302

DETECT THE RED AREA COMPARED TO THE SKIN COLOR DETERMINED
IN STEP 1302
1304

CONVERT THE RED AREA DETERMINED IN STEP 1304 TO THE SKIN
COLOR (E.G. HUE/SATURATION/LUMINOSITY/ETC.)
1306

1300

DETERMINE THE SKIN COLOR THAT REPRESENTS THE WHOLE FACE OF A USER
1402

PROCESS THE EDGES AND GET THE REGIONS THAT CONTAIN NOISE
1404

SET THE MASK THAT COVERS THE DETAILED AREA
1406

REMOVE AREA OF STEP 1406 FROM AREA OF STEP 1404
1408

APPLY A STRONG LPF TO AREA OF STEP 1408
1410

1400

METHOD AND SYSTEM OF RENDERING A 3D IMAGE FOR AUTOMATED FACIAL MORPHING

CROSS-REFERENCE TO RELATED APPLICATIONS

This application claims priority to U.S. patent application Ser. No. 16/888,798, titled METHOD AND SYSTEM OF AUTOMATED FACIAL MORPHING FOR EYEBROW HAIR AND FACE COLOR DETECTION and filed on 31 May 2020. This application is hereby incorporated by reference in its entirety.

U.S. patent application Ser. No. 16/398,242 is a continuation of and claims priority to U.S. patent application Ser. No. 16/398,242, titled METHOD AND SYSTEM OF AUTOMATED FACIAL MORPHING FOR EYEBROW HAIR AND FACE COLOR DETECTION and filed on 29 Apr. 2019. This application is hereby incorporated by reference in its entirety.

U.S. patent application Ser. No. 16/398,242, titled METHOD AND SYSTEM OF AUTOMATED FACIAL MORPHING FOR EYEBROW HAIR AND FACE COLOR DETECTION claims priority to U.S. provisional patent application No. 62/664,271, titled METHOD AND SYSTEM OF AUTOMATED FACIAL MORPHING and filed on 30 Apr. 2018. This application is hereby incorporated by reference in its entirety.

U.S. patent application Ser. No. 16/398,242, titled METHOD AND SYSTEM OF AUTOMATED FACIAL MORPHING FOR EYEBROW HAIR AND FACE COLOR DETECTION claims priority to U.S. provisional patent application No. 62/774,864, titled METHOD AND SYSTEM OF AUTOMATED FACIAL MORPHING and filed on 4 Dec. 2018. This application is hereby incorporated by reference in its entirety.

BACKGROUND

1. Field

This application relates generally to 3D model morphing, and more particularly to a system, method, and article of manufacture of rendering a 3D image for automated facial morphing.

2. Related Art

Aesthetic medicine and other cosmetic treatments are increasing in popularity. Treatments in this area can be permanent. Accordingly, patients often wish to view simulation s of the final outcome. Patients also prefer to be able select from a set of possible outcomes. Consequently, various facial morphing methods are used to provide simulated outcomes. However, these methods may use 3D model morphing and often require high-levels of computer processing power and specialized algorithms to adequately model each individual patient's face. These may only be available at a cosmetic-treatment doctor's office. However, patients may wish to try various options on their faces prior to visiting the cosmetic-treatment doctor. Accordingly, improvements to methods of rendering a 3D image for automated facial morphing are desired.

BRIEF SUMMARY OF THE INVENTION

In one aspect, a computerized method for rendering a three-dimensional (3D) digital image for automated facial morphing includes the step scanning of the user's face with a digital camera to obtain a set of digital images of the user's face. The method includes the step of determining that a user's face is in a compliant state. The method includes the step of implementing an analysis of the set of digital images and implementing a set of pre-rendering steps. Each digital image comprises a depth data, a red/green/blue (RGB) data, and a facemask data. The method then implements an iterative closest path (ICP) algorithm that correlates the set of digital images together by stitching together the cloud of points of the facemask data of each digital image and outputs a set of transformation matrices. The method includes the step of implementing a truncated signed distance function (TSDF) algorithm on the set of transformation matrices. The TSDF algorithm represents each point of the transformation matrices in a regularized voxel grid and outputs a set of voxel representations as a one-dimension (1-D) array of voxels. The method includes the step of implementing a marching cubes algorithm that obtains each voxel representation of the 1-D array of voxels and creates a three-dimensional (3D) mesh out of the per-voxel values provided by the TSDF and outputs a mesh representation. The mesh representation comprises a set of triangles and vertices. The method comprises the step of implementing a cleaning algorithm that obtains the mesh representation and cleans the floating vertices and triangles and outputs a mesh. The mesh comprises a set of scattered points with a normal per point. The method includes the step of implementing a Poisson algorithm on the mesh output and fills in any holes of the mesh. The Poisson algorithm outputs a reconstructed mesh. The method includes the step of implementing a texture mapping algorithm that outputs a mask representation. The mask representation illustrates each piece of the digital image with texture values and label values. The method includes the step of implementing an image stitching algorithm that stitches the digital images with different lighting values to remove any seams. The image stitching algorithm outputs a single digital image with consistent lighting. The method includes the step of rendering the 3D digital image of the user's face from the single digital image with consistent lighting.

BRIEF DESCRIPTION OF THE DRAWINGS

The present application can be best understood by reference to the following description taken in conjunction with the accompanying figures, in which like parts may be referred to by like numerals.

Figure 1:
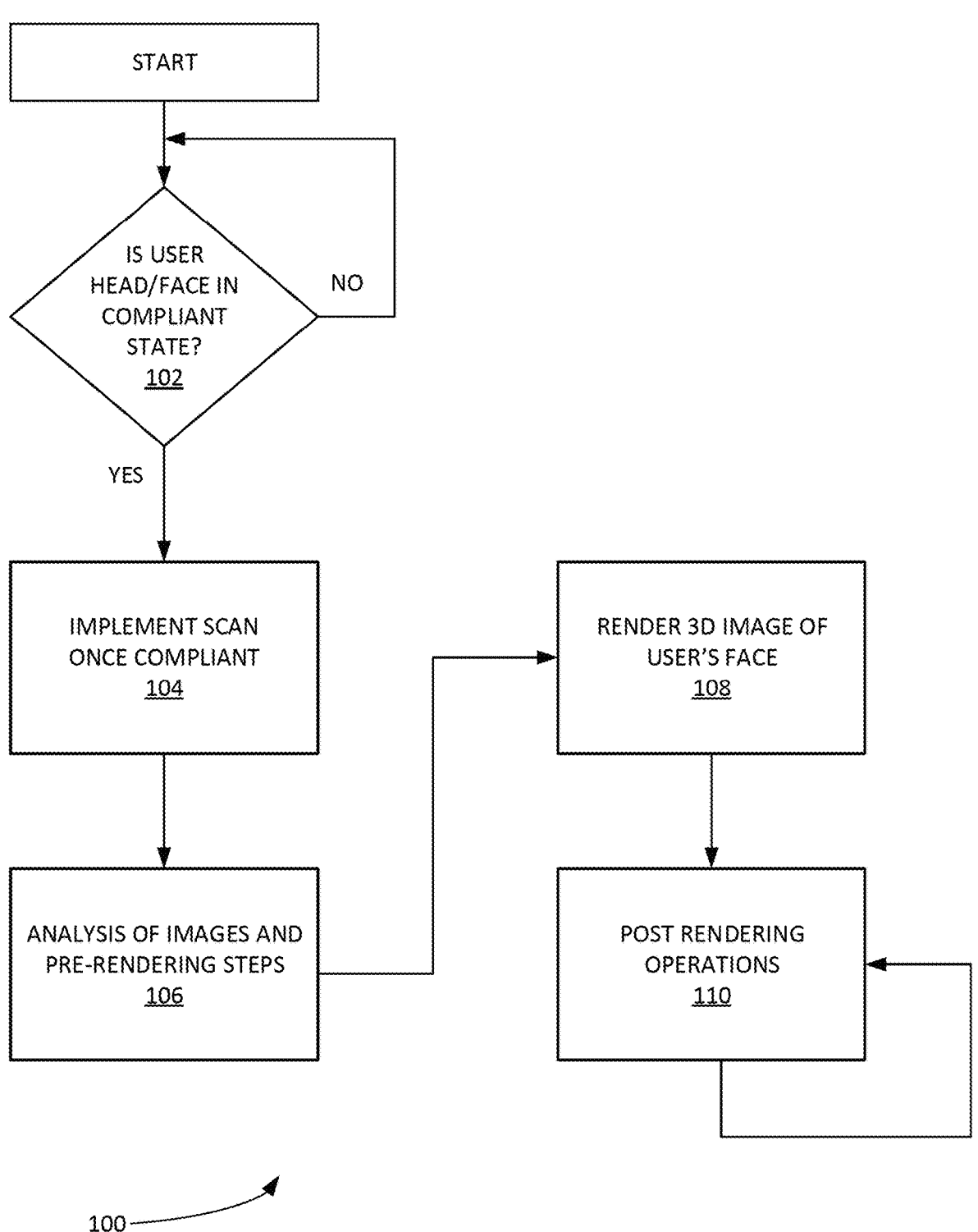
FIG. 1 illustrates an example process for rendering a 3D image for automated facial morphing, according to some embodiments.

The Figures described above are a representative set and are not an exhaustive with respect to embodying the invention.

DESCRIPTION

Disclosed are a system, method, and article of manufacture for rendering a 3D image for automated facial morphing. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

ARKit® is an API tool for developers working on virtual reality and augmented reality applications. The ARKit tool can accurately map a surrounding or object using SLAM (Simultaneous Localization and Mapping). Third-party developers can use ARKit to build augmented reality applications, leveraging a mobile device's camera, CPU, GPU, and motion sensors. ARKit can provide a face mesh showing automatic estimation of the real-world directional lighting environment. It is noted that in other embodiments, other relevant tools can be used in lieu of ARKit.

Computer vision is an interdisciplinary field that deals with how computers can be made for gaining high-level understanding from digital images or videos. From the perspective of engineering, it seeks to automate tasks that the human visual system can do.

Dlib is a general-purpose cross-platform software library written in the programming language C++.

Edge detection includes a variety of mathematical methods that aim at identifying points in a digital image at which the image brightness changes sharply or, more formally, has discontinuities.

Image stitching can include the process of combining multiple photographic images with overlapping fields of view to produce a segmented panorama or high-resolution image.

Iterative closest path (ICP) can be an algorithm employed to minimize the difference between two clouds of points. ICP can implement computationally accurate and efficient registration of 3-D shapes which includes free form curves and surface. ICP is often used to reconstruct 3D surfaces from various scans, etc.

Low-pass filter (LPF) is a filter that passes signals with a frequency lower than a selected cutoff frequency and attenuates signals with frequencies higher than the cutoff frequency. The exact frequency response of the filter depends on the filter design.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Marching cubes is a computer graphics algorithm for extracting a polygonal mesh of an isosurface from a three-dimensional discrete scalar field (e.g. a voxel).

OpenCV (Open Source Computer Vision) is a library of programming functions mainly aimed at real-time computer vision.

Open Graphics Library (OpenGL) is a cross-language, cross-platform application programming interface (API) for rendering 2D and 3D vector graphics.

3D computer graphics can be computer graphics that use a three-dimensional representation of geometric data.

Rendering or image synthesis is the automatic process of generating a photorealistic or non-photorealistic image from a 2D or 3D model (or models in what collectively could be called a scene file) by means of computer programs.

Signed distance function of a set Ω in a metric space determines the distance of a given point x from the boundary of Ω, with the sign determined by whether x is in Ω. The function has positive values at points x inside Ω, it decreases in value as x approaches the boundary of Ω where the signed distance function is zero, and it takes negative values outside of Ω.

Texture mapping can be a method for defining high frequency detail, surface texture, or color information on a computer-generated graphic or 3D model.

Truncated signed distance function (TSDF) can be a volumetric scene representation that enables for integration of multiple depth images taken from different viewpoints.

Voxel represents a value on a regular grid in three-dimensional space. A voxel can be used by a rendering system to infer the position of a voxel based upon its position relative to other voxels (e.g., its position in the data structure that makes up a single volumetric image).

Example Method for Generating a 3D Model of a User'S Face

Example embodiments of an automated facial morphing application can be used enable plastic surgery candidates to view digital renderings of images that the candidate will appear like after cosmetic surgery. The automated facial morphing application can 'automate' the candidate's experience by evaluating the candidate's face and automatically applying facial elements such as a preferred eyebrow, a preferred nose, etc. It is noted that previously facial morphing system were not automated and limited to expensive systems available in a doctor's office. In contrast, the automated facial morphing application can implement this facial morphing experience to a mobile device and can be managed by the plastic surgery candidate without professional assistance. The automated facial morphing application can be used to preview facial morphing in anticipation of, inter alia: facelifts, rhinoplasties, lip augmentations, eyebrow adjustments, etc. The automated facial morphing application can identify facial features by extracting landmarks, or features, from an image of the subject's face. For example, an algorithm may analyze the relative position, size, and/or shape of the eyes, nose, cheekbones, and jaw.

In one example, the mobile device system can include a facial recognition camera system. This can be a depth-sensing camera system. The depth-sensing camera system can include a dot projector. The dot projector can project n-number of dots (e.g. 30,000 dots, etc.) onto a user's face. The depth-sensing camera system can include an infrared camera that reads the dot pattern and captures an infrared digital image. The digital image of the dots can be used to build a facial map of the user. The depth-sensing camera system can include a flood illuminator. The flood illuminator can provide an infrared projection light source.

In one example, the depth-sensing camera system can be a TRUEDEPTH® camera (e.g. as used in an IPHONE® mobile device, etc.). In one example, the TrueDepth camera can be 7-megapixel and have an f/2.2 aperture. The mobile device system can implement face detection and HDR.

FIG. 1 illustrates an example process 100 for 3D morphable image of a user's face, according to some embodiments. In step 102, process 100 can determine whether the user's head/face is in a compliant state? For example, process 100 can determine if the user's face is straight (e.g. the central axis of the user's face is perpendicular to a horizonal plane, etc.). Parameters for a compliant state can include, inter alia: user is looking straight ahead, no hair in user's face, user not smiling, etc. Process 100 can push messages (e.g. text messages with an application, voice-based instructions, haptic feedback, etc.) that instruct the user to, inter alia: "look straight ahead", "pull hair back", "don't smile", etc. Process 100 can repeat the instructions until the user is in a compliant state.

Figure 9:
FIG. 9 shows an example set of digital images obtained from a scan of the user's face, according to some embodiments.

Process 100 can proceed to step 104. In step 104, process 100 can implement a scan of the user's face. FIG. 9 infra shows an example set of digital images obtained from a scan of the user's face, according to some embodiments. The user can place their head in the various positions shown. For example, a user can look to the right, to the center, to the left and the upward. In other example embodiments, other positions and/or sequences of head movement can be utilized. During the movement of the user's head, process 100 can take a series of around 75 images with corresponding depth information (e.g. using from a TrueDepth camera systems and/or similar camera system such as described supra, etc.). The mobile device implementing process 100 can obtain the depth information of the various digital images. Process 100 can obtain a series of digital RGB photos in bursts. The digital RGB photos can be combined with the depth information from depth-sensing camera system. It is noted that in some embodiments, a digital video is not obtained, but rather a series of digital-image frames and the depth information corresponding to each respective digital-image frame.

Figure 2:
FIG. 2 illustrates an example process for analyze a set of image obtained for rendering a 3D facial image of a user, according to some embodiments.
Figure 3:
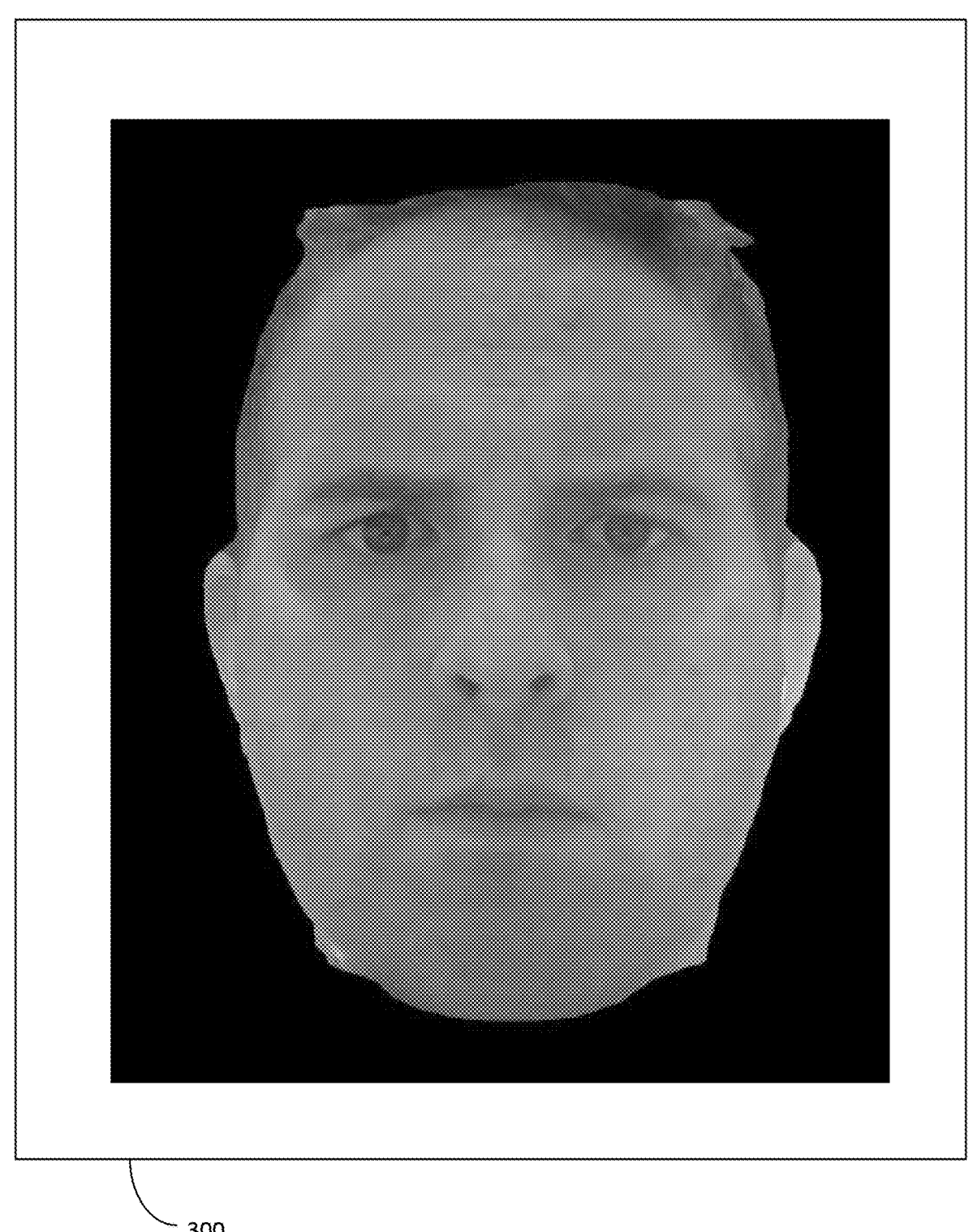
FIGS. 3-8 illustrate a set of example post scan digital images to be utilized by process for generating a 3D model of a user's face.
Figure 4:
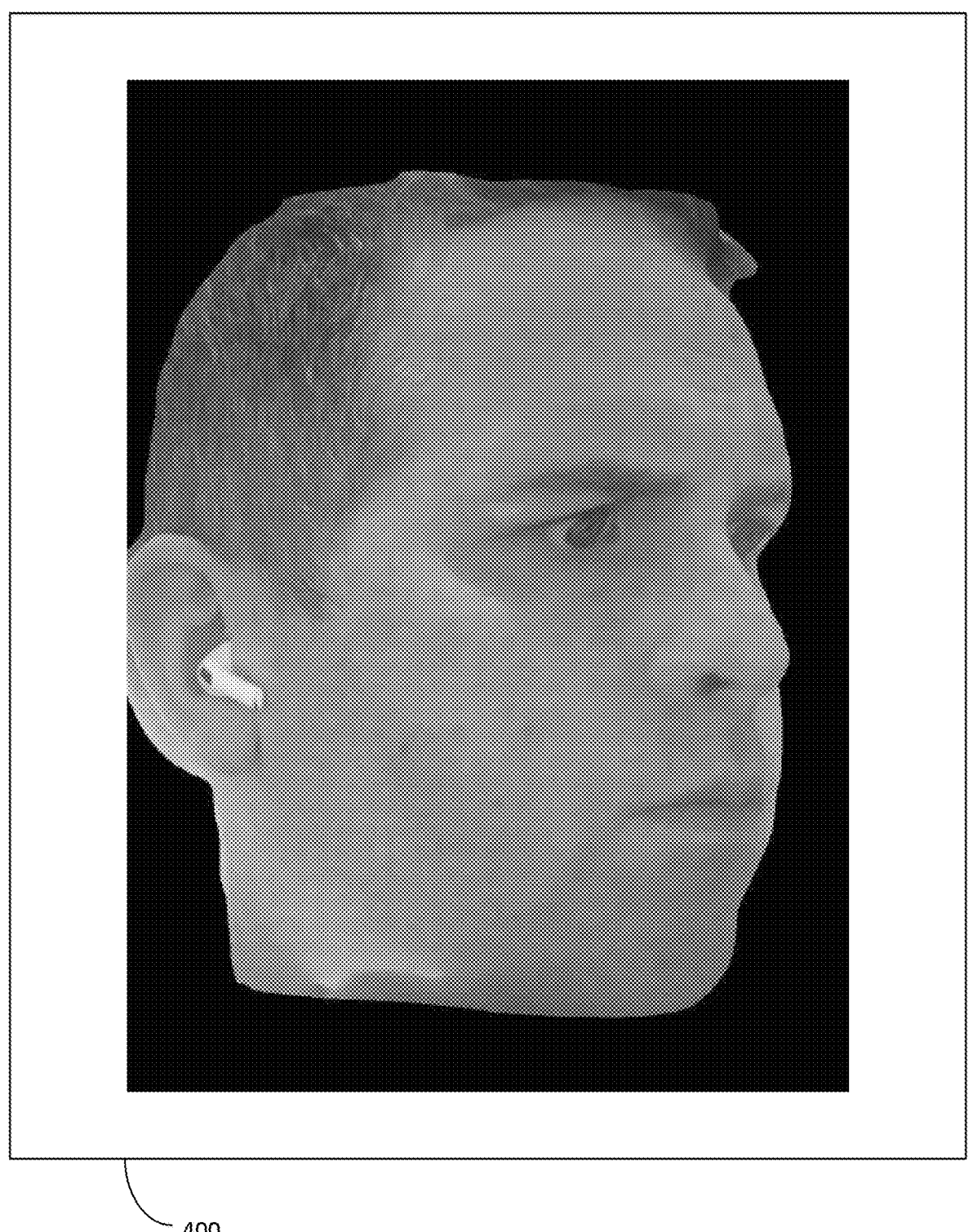
Figure 5:
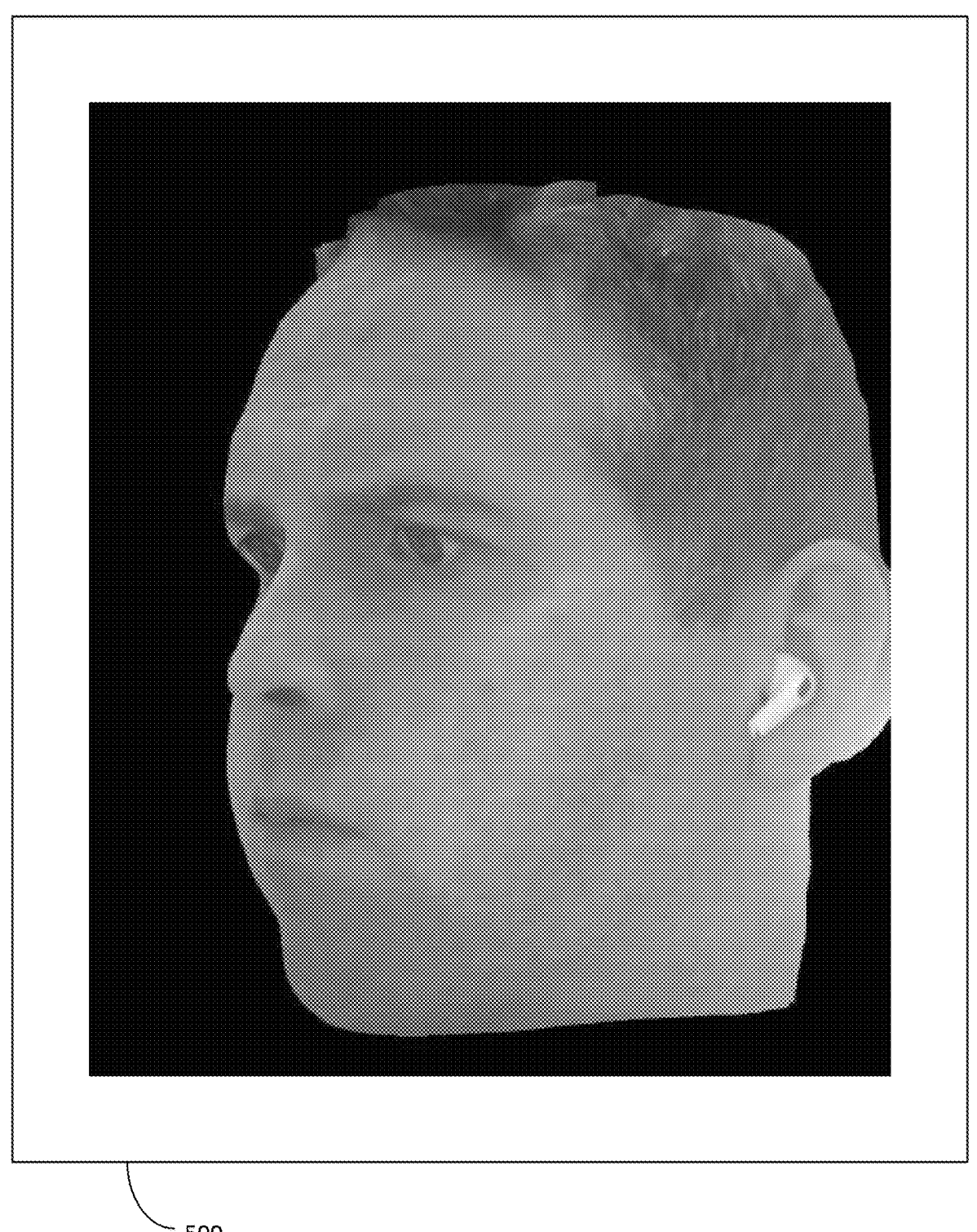
Figure 6:
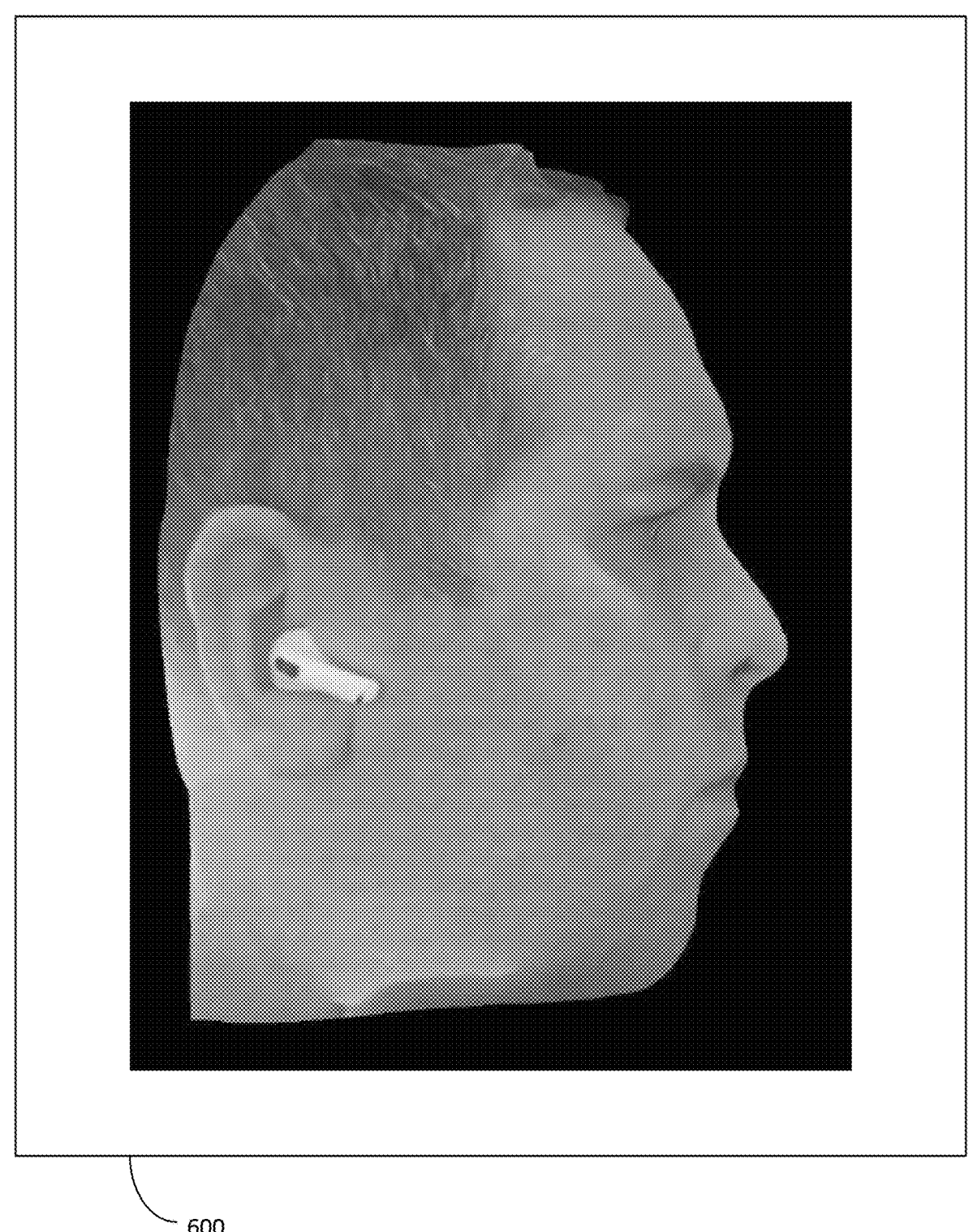
Figure 7:
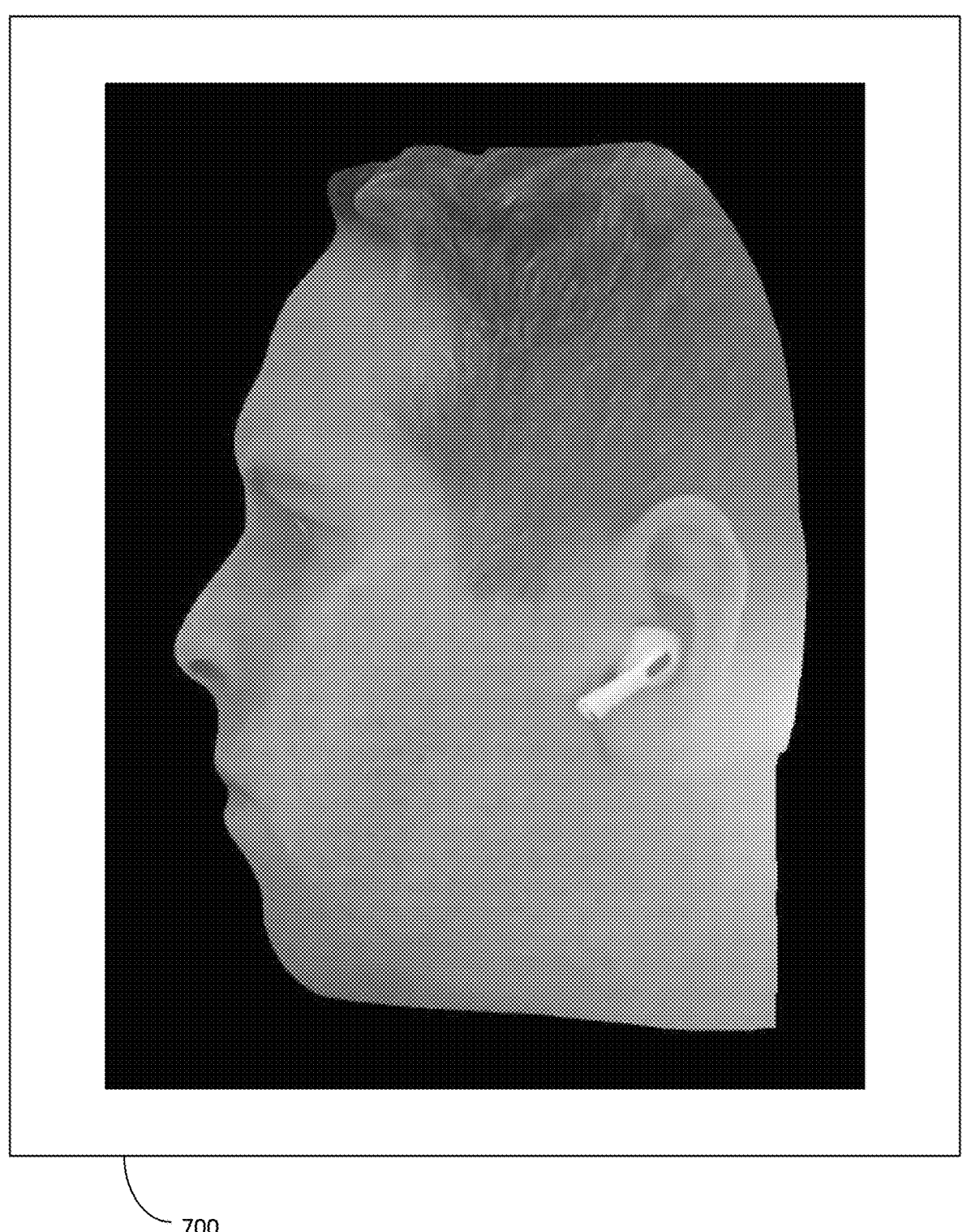
Figure 8:
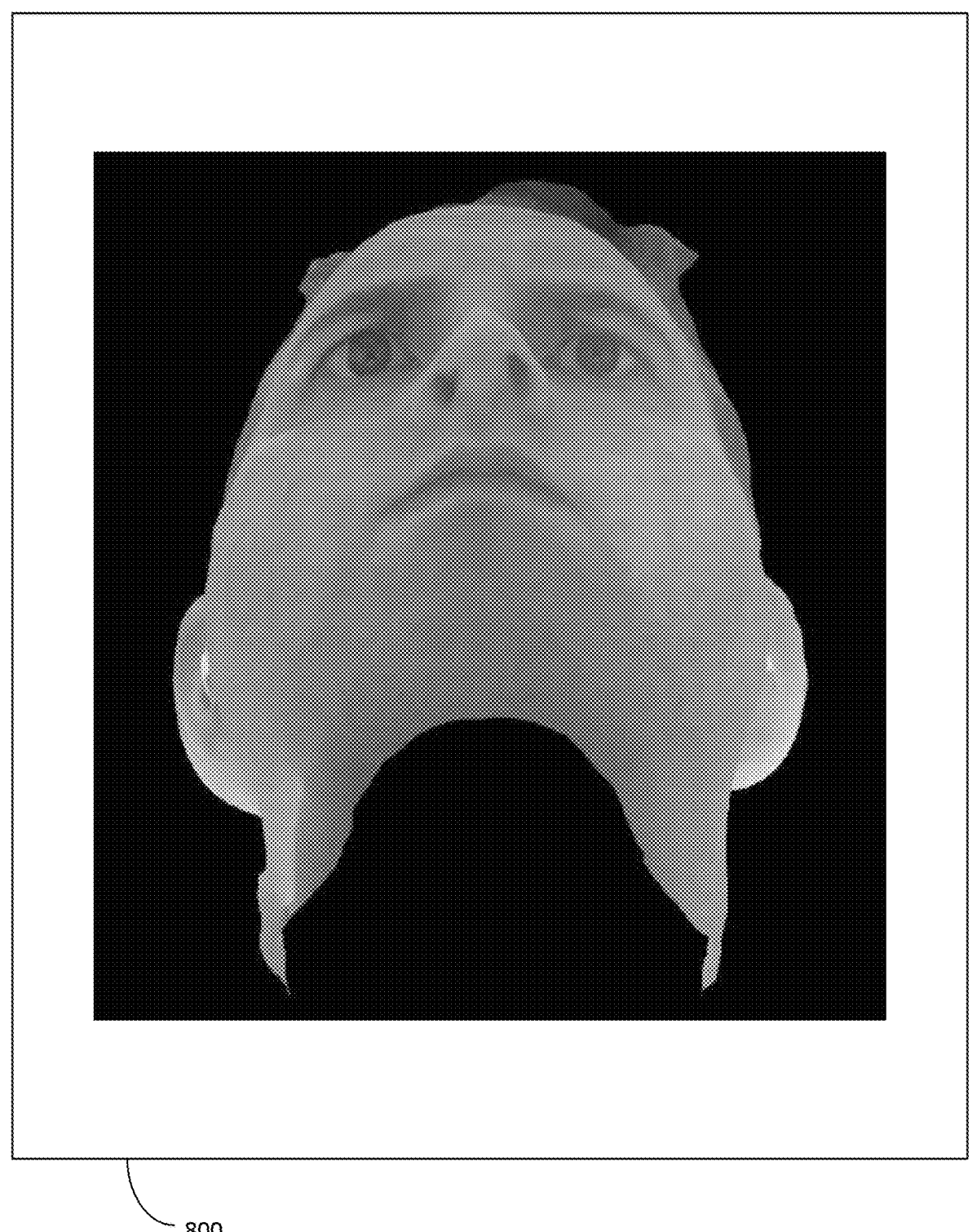

Process 100 can then proceed to step 106. In step 106, process 100 can implement analysis of digital images and various pre-rendering steps. FIG. 2 illustrates an example process 200 for analyze a set of images obtained for rendering a 3D facial image of a user, according to some embodiments. Process 200 can be used for processing the digital images post scan but pre-render of the 3D model.

In step 202, process 200 can implement an ICP algorithm (e.g. an OpenCV ICP algorithm, etc.). Process 200 can optimize between a first view and the other views. The points can be chosen by using ARKit face mask to ensure that they are only located on the user's face. The inputs can include, inter alia: depth image (e.g. a file path), RGB Image (File path), ARKit Facemask (e.g. file path), etc. The ICP stitches together the points from the facemask (e.g. the facemask sits on a user's face) and the correlated images. The outputs of step 202 can include the transformations, etc.

In step 204, process 200 can implement a TSDF algorithm on the output of step 202. The TSDF algorithm represents the points in a regularized voxel grid. The inputs in step 204 include, inter alia: transformations, depth image. The TSDF algorithm can continue to blend and match together all the digital images. For example, meshes with triangles and vertices of the output of the ICP step 202 can be blended and matched in one uniform object. The output of step 204 includes a voxel representation (e.g. a 1-D array of voxels).

The remaining steps, as shown infra, provide cleaning steps to clear out floating vertices (e.g. an artifact that is outside of the face), fill in holes between meshed together images, implement texture mapping, image stitching (e.g. obtain texture map of the three images and combine and image stitch this into a single image), etc.

In step 206, process 200 can implement a marching cubes algorithm. Step 206 obtains a voxel representation (e.g. 1-D array of voxels). Process 200 can create a 3D mesh out of per-voxel values provided by the TSDF inputs. Step 206 outputs a mesh representation (e.g. triangles and vertices).

In step 208, process 200 implements cleaning algorithms. Step 208 obtains the Mesh Outputs of step 206. Process 200 then cleans the floating vertices and triangles. Process 200 can clean various patches on the back of the head. Process 200 can clean around patches neck. Step 208 can output a mesh (e.g. scattered points with a normal per point).

In step 210, process 200 can implement various Poisson algorithms on the mesh output of step 208. Process 200 uses the Poisson algorithm to fill in the holes of the mesh. The output of step 210 can be a reconstructed mesh that is passed to step 212.

In step 212, process 200 can implement texture mapping. Process 200 can use a cylinder to map the texture constructed by three images coming from the three different views. The inputs of step 212 can be the mesh output of step 210, three RGB images and the transformation matrices calculated through ICP algorithm. Step 212 can output a texture (e.g. saved as "pixels.png" in a document directory of the mobile-device application). Step 212 can also create a "labels.png" as a mask representation that illustrates each piece of the image comes from a different source.

In step 214, process 200 can implement image stitching. Process 200 can stitch images with different lighting to remove seams. Step 214 can receive the single image consists of multiple images with different lighting. A label image that consists of one specific label color for each piece of image that comes from different lighting. Step 214 can output one image with consistent lighting over all pieces (e.g. "texture.png").

Returning to process 100, the output of (e.g. the output of process 200) can be provided in step 108. In step 108, process 100 can render the 3D image user's face. The 3D model can be rendered using a custom library with an internal SDK as well. A hardware-accelerated 3D graphic and compute shader application programming interface (API) can be used to render it (e.g. METAL®, etc.). The rendering can be displayed in a mobile-device application display.

In step 110 process 100 can implement post rendering operations (e.g. automated and/or manual facial morphing processes, etc.). Example automated facial morphing processes, can include, inter alia: ability to segregate face into regions for injectables; under-eye bag removal; blepharoplasty morphing; jawline reduction; beard detection; autocorrection of crooked noses; etc. Additional processes that can be implemented with the 3D model include processes 1100-1400 discussed infra.

Example Digital Images

FIGS. 3-8 illustrate a set of example post scan digital images 800 to be utilized by process 200 for generating a 3D model of a user's face. The set of example post scan digital images can be generated from set of digital images 900.

FIG. 9 shows an example set of digital images 900 obtained from a scan of the user's face, according to some embodiments.

Figure 10:
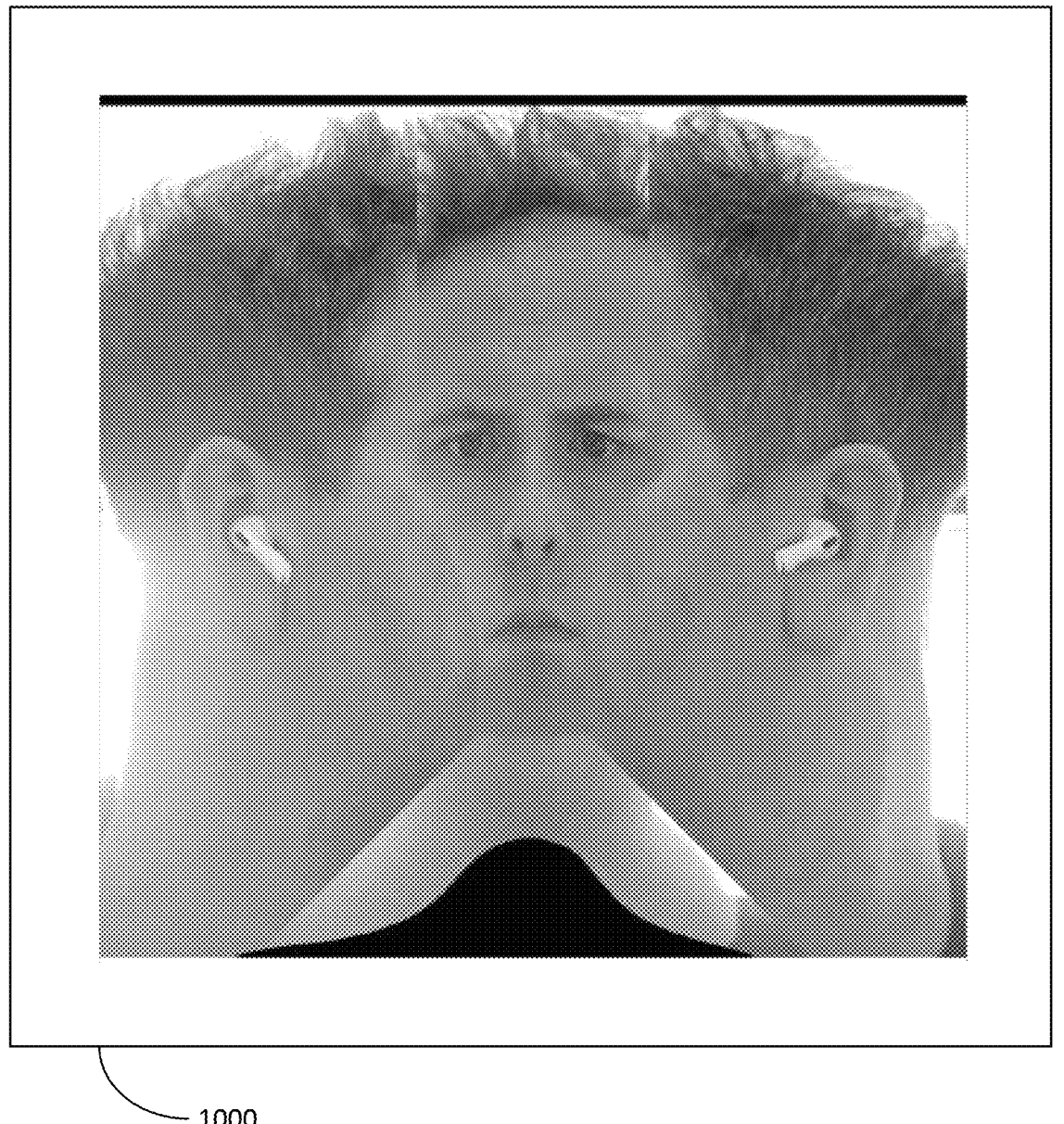
FIG. 10 illustrates an example digital image of a texture map, according to some embodiments. The texture map is generated from the combination of three images that are then flattened out.

FIG. 10 illustrates an example digital image of a texture map 1000, according to some embodiments. The texture map is generated from the combination of three images that are then flattened out.

Additional Example Processes

FIGS. 11-14 illustrate additional example automated facial morphing processes according to some embodiments.

Figure 11:
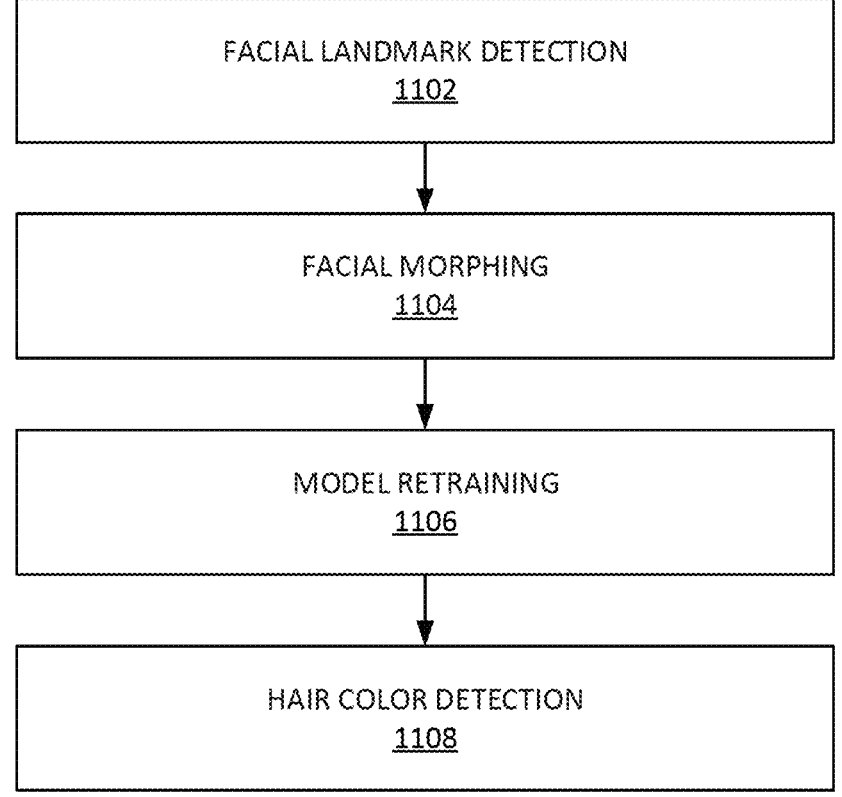
FIG. 11 schematically depicts an example process for automated facial morphing, according to some embodiments.

FIG. 11 schematically depicts an example process 1100 for automated facial morphing, according to some embodiments. More specifically, in step 1102, process 1100 can implement facial landmark detection. In step 1104, process 1100 can implement facial morphing. In step 1106, process 1100 can implement model retraining. In step 1108, process 1100 can implement hair color detection.

Figure 12:
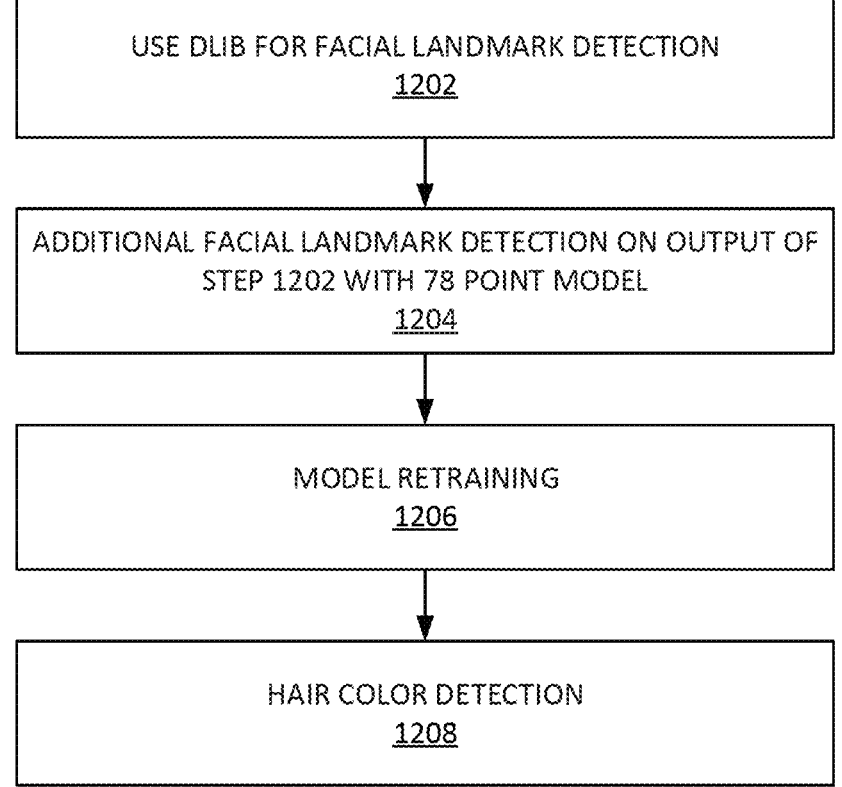
FIG. 12 illustrates an example process for facial landmark detection, according to some embodiments.

FIG. 12 illustrates an example process 1200 for facial landmark detection, according to some embodiments. It is noted that facial landmark detection is different from facial recognition in the sense that landmark detection is the process of identifying facial features on a face. In one example, process 1100 can use various open source tool (e.g. Dlib, etc.) to do an initial phase of facial landmark detection. However, because of the level of detail that is to be obtained around a specified set of the features, such as: eyebrow, nose, and lip detection. Process 1200 can generate an n-point model (e.g. seventy-eight (78) point model, eighty-five (85) point model, etc.) that provides a higher resolution on the eyebrow in particular.

More specifically, in step 1202, process 1200 can use Dlib for facial landmark detection. In step 1204, process 1200 can use additional facial landmark detection on output of step 1202 with a higher resolution seventy-eight (78) point model that focuses on the eyebrow region. In step 1206, process 1200 can implement hair/eyelid detection using OpenCV as well as doing fast edge detection using a structured forest model. In step 1208, process 1200 can compensate for poor lighting/face angles using an OpenCV heuristics mechanism. It is noted that in some example embodiments another computer vision library can be used in lieu of OpenCV. Additionally, in some example embodiments, an n-point model other than a seventy-eight (78) point model can be utilized.

Returning to process 1100. Process 1100 can implement facial morphing by morphing the following areas of the face: skin, lips, eyebrows, nose, etc. These morphs can be implemented using OpenGL on an iOS device in one example.

Process 1100 can implement model retraining. Process 1100 can feed production images back into the model. This can enable process 1100 to retrain the model periodically and improve the detection of facial landmark features on a wider variety of user segments (e.g. various ages, ethnicities, lighting, etc.).

Figure 13:
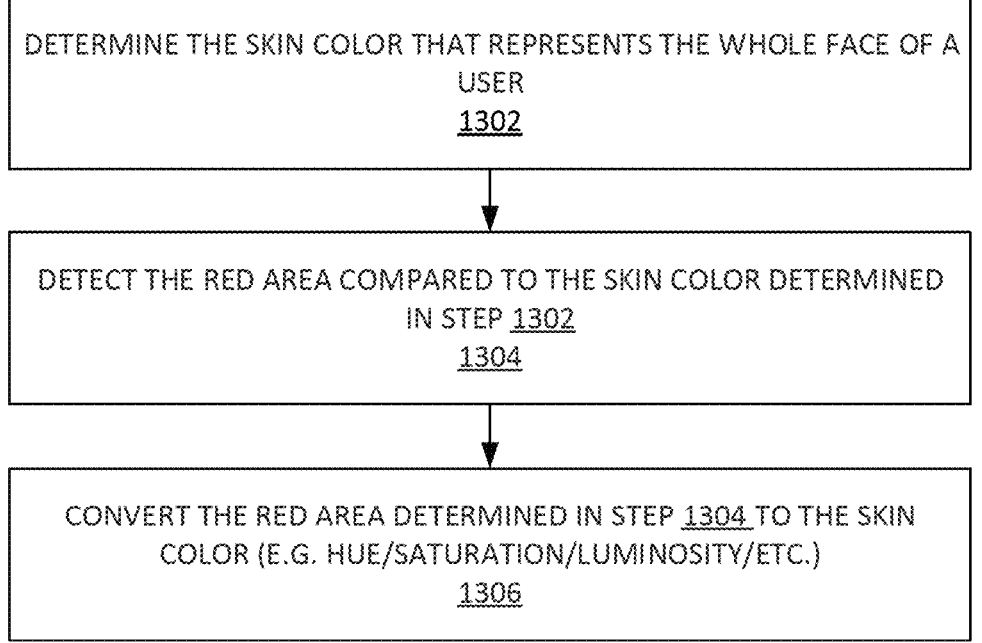
FIG. 13 illustrates an example process for removing acne effects from a digital image of a user, according to some embodiments.

FIG. 13 illustrates an example process 1300 for removing acne effects from a digital image of a user, according to some embodiments. Process 1300 can be used to remove the redness in a digital image of a user's face that is associated with acne.

In step 1302, process 1300 can determine the skin color that represents the whole face. IN step 1304, process 1300 can detect the red area compare to the skin color. In step 1306, process 1300 can convert the area of step 1304 to the skin color (e.g. same hue/sat/lum/etc.).

Figure 14:
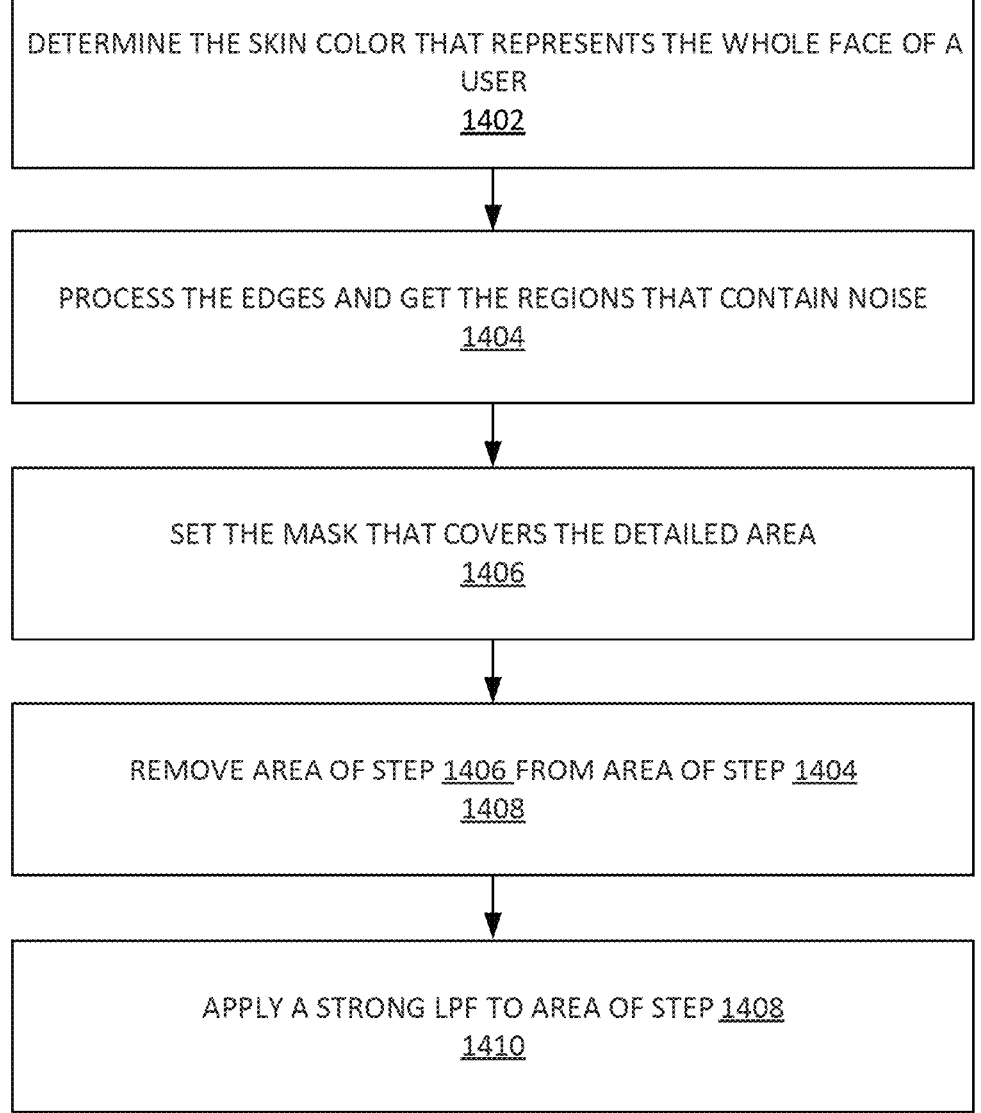
FIG. 14 illustrates an example process for smoothing skin effects in a digital image, according to some embodiments.

FIG. 14 illustrates an example process 1400 for smoothing skin effects in a digital image, according to some embodiments. Process 1400 can be used to smooth skin effects of a user's face in a digital image.

In step 1402, process 1400 can detect edges from a black and white digital image. The black and white digital image can be of a user's face. In step 1404, process 1400 can process the edges and get the regions that contain noise. In step 1406, process 1400 can set the mask that covers the detailed area (e.g. eyes, nose, and mouth). In step 1408, process 1400 can remove area of step 1406 from area of step 1404. In step 1410, process 1400 can apply a strong LPF to the area of step 1408.

Example Computing Systems

Figure 15:
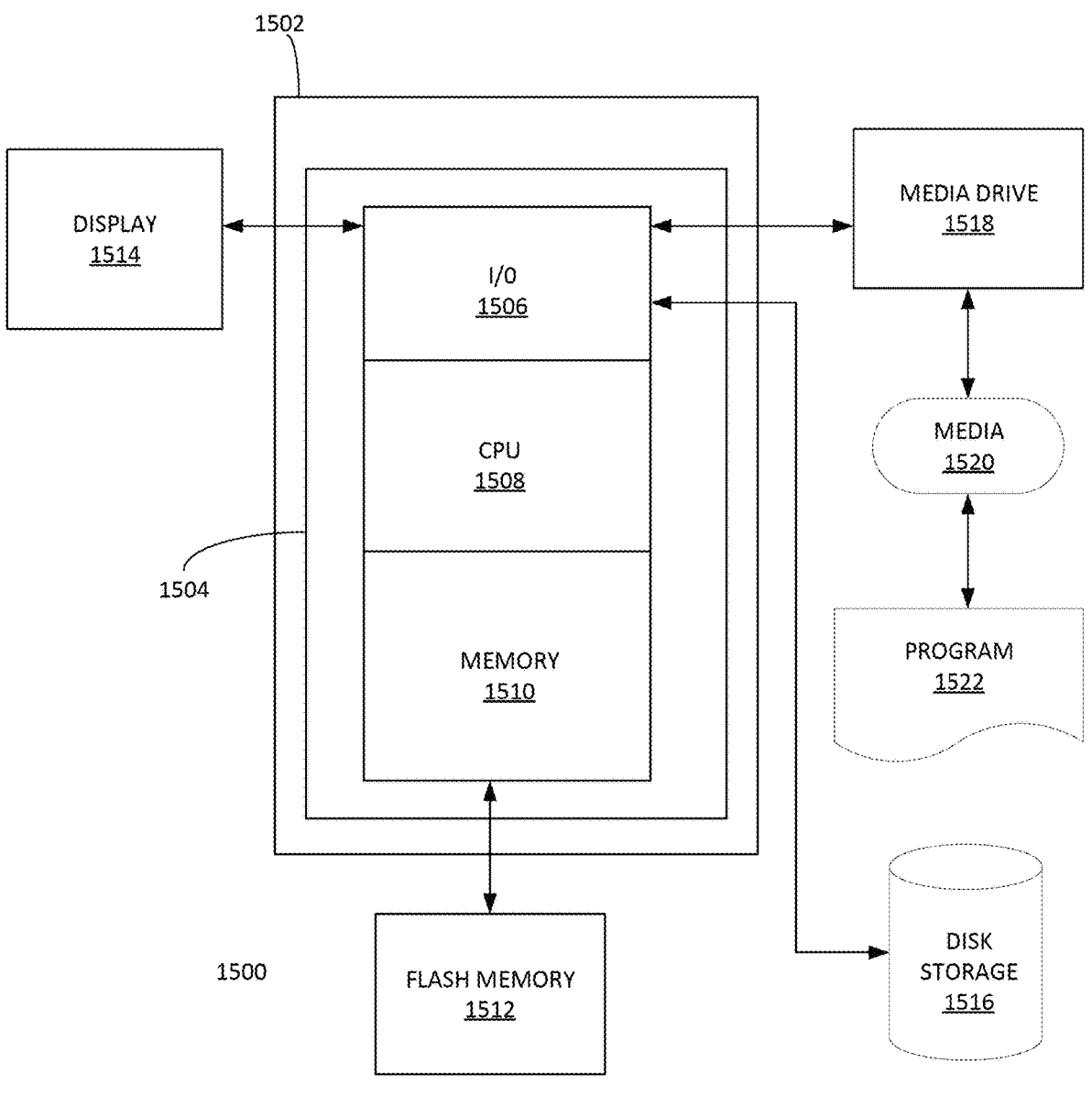
FIG. 15 depicts an exemplary computing system that can be configured to perform any one of the processes provided herein.

FIG. 15 depicts an exemplary computing system 1500 that can be configured to perform any one of the processes provided herein. In this context, computing system 1500 may include, for example, a processor, memory, storage, and I/O devices (e.g., monitor, keyboard, disk drive, Internet connection, etc.). However, computing system 1500 may include circuitry or other specialized hardware for carrying out some or all aspects of the processes. In some operational settings, computing system 1500 may be configured as a system that includes one or more units, each of which is configured to carry out some aspects of the processes either in software, hardware, or some combination thereof.

FIG. 15 depicts computing system 1500 with a number of components that may be used to perform any of the processes described herein. The main system 1502 includes a motherboard 1504 having an I/O section 1506, one or more central processing units (CPU) 1508, and a memory section 1510, which may have a flash memory card 1512 related to it. The I/O section 1506 can be connected to a display 1514, a keyboard and/or other user input (not shown), a disk storage unit 1516, and a media drive unit 1518. The media drive unit 1518 can read/write a computer-readable medium 1520, which can contain programs 1522 and/or data. Computing system 1500 can include a web browser. Moreover, it is noted that computing system 1500 can be configured to include additional systems in order to fulfill various functionalities. In another example, computing system 1500 can be configured as a mobile device and include such systems as may be typically included in a mobile device such as GPS systems, gyroscope, accelerometers, cameras, etc.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for rendering a three-dimensional (3D) digital image for automated facial morphing comprising:

scanning of a user's face with a digital camera to obtain a set of digital images of the user's face;

determining that the user's face is in a compliant state;

implementing an analysis of the set of digital images and implementing a set of pre-rendering steps by:

wherein each digital image comprises a depth data, a red/green/blue (RGB) data, and a facemask data, implementing an iterative closest path (ICP) algorithm that correlates the set of digital images together by stitching together a cloud of points of the facemask data of each digital image and outputs a set of transformation matrices, implementing a truncated signed distance function (TSDF) algorithm on the set of the transformation matrices, wherein the TSDF algorithm represents each point of the transformation matrices in a regularized voxel grid and outputs a set of voxel representations as a one-dimension (1-D) array of voxels, implementing a marching cubes algorithm that obtains each voxel representation of the 1-D array of voxels and creates a three-dimensional (3D) mesh out of the per-voxel values provided by the TSDF and outputs a mesh representation, wherein the mesh representation comprises a set of triangles and vertices, implementing a cleaning algorithm that obtains the mesh representations and cleans a floating vertices and triangles and outputs a mesh, wherein the mesh comprises a set of scattered points with a normal per point, implementing a Poisson algorithm on the mesh output and fills in any holes of the mesh, wherein the Poisson algorithm outputs a reconstructed mesh, implementing a texture mapping algorithm that outputs a mask representation, wherein the mask representation illustrates each piece of the digital image with texture values and label values, and implementing an image stitching algorithm that stitches the digital images with different lighting values to remove any seams; and outputs a single digital image with consistent lighting; and rendering a 3D digital image of the user's face from the single digital image with consistent lighting, wherein the compliant state comprises that a central axis of the user's face is perpendicular to a horizonal plane of the digital camera.

2. The computerized method of claim 1, wherein the compliant state comprises that the user is looking straight ahead towards the digital camera, that there is no head hair in the user's face and that the user is not smiling.

3. The computerized method of claim 1, wherein the points of each cloud of points are chosen by using an ARKit face mask to ensure that each of the points are only located on the user's face.

4. The computerized method of claim 1, wherein the TSDF algorithm blends and matches together all the digital images.

5. The computerized method of claim 4, wherein a set of meshes with triangles and vertices of the output of the ICP are blended and matched in one uniform object.

6. The computerized method of claim 4, wherein the cleaning algorithm cleans a set of patches of a neck portion, and wherein the cleaning algorithm outputs a set of scattered points with a normal per point of the mesh.

7. The computerized method of claim 1, wherein the cleaning algorithm cleans various patches on a back of a head portion.

8. The computerized method of claim 1, wherein the texture mapping algorithm uses a cylinder to map a texture constructed by three digital images of a three different views.

9. The computerized method of claim 1, wherein a 3D model is rendered using a custom library with an internal software development kit of a mobile device.

10. The computerized method of claim 9, wherein the mobile device comprises a hardware-accelerated 3D graphic and compute shader application programming interface (API) to render the 3D digital image of the user's face.

11. The computerized method of claim 10, wherein the 3D digital image of the user's face is displayed on the mobile device.

12. The computerized method of claim 1 further comprises;

implementing one or more post rendering operations comprising at least one automated facial morphing process.

13. The computerized method of claim 12, wherein the automated facial morphing process comprises an ability to segregate the user's face into regions for injectables; an under-eye bag removal; a blepharoplasty morphing; a jawline reduction; a beard detection; or an autocorrection of a crooked nose.

* * * * *